US012352393B2

(12) United States Patent
Xu et al.

(10) Patent No.: US 12,352,393 B2
(45) Date of Patent: Jul. 8, 2025

(54) LIGHTING APPARATUS

(71) Applicant: LEEDARSON LIGHTING CO., LTD., Fujian (CN)

(72) Inventors: Xuanyun Xu, Fujian (CN); Hongkui Jiang, Fujian (CN); Hongbin Lin, Fujian (CN); Huasheng Liu, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/735,098

(22) Filed: Jun. 5, 2024

(65) Prior Publication Data

US 2025/0075865 A1 Mar. 6, 2025

(30) Foreign Application Priority Data

Aug. 30, 2023 (CN) ........................ 202322340063.9

(51) Int. Cl.

| | |
|---|---|
| ***F21K 9/238*** | (2016.01) |
| ***F21K 9/237*** | (2016.01) |
| ***F21V 23/04*** | (2006.01) |
| ***F21V 31/00*** | (2006.01) |
| *F21Y 105/18* | (2016.01) |
| *F21Y 115/10* | (2016.01) |

(52) U.S. Cl.

CPC .............. *F21K 9/238* (2016.08); *F21K 9/237* (2016.08); *F21V 23/04* (2013.01); *F21V 31/00* (2013.01); *F21Y 2105/18* (2016.08); *F21Y 2115/10* (2016.08)

(58) Field of Classification Search

CPC .......... F21K 9/238; F21K 9/237; F21V 23/04; F21V 31/00; F21Y 2105/18; F21Y 2115/10

See application file for complete search history.

(56) References Cited

U.S. PATENT DOCUMENTS

| | | | | |
|---|---|---|---|---|
| 11,248,753 | B1 * | 2/2022 | Li | F21K 9/232 |
| 11,906,114 | B2 * | 2/2024 | Halliwell | F21V 3/00 |
| 2012/0120639 | A1 * | 5/2012 | Armer | F21L 4/027 362/158 |
| 2014/0265905 | A1 * | 9/2014 | Ray | F21K 9/232 315/210 |
| 2018/0031183 | A1 * | 2/2018 | Wegh | F21V 29/83 |
| 2020/0187319 | A1 * | 6/2020 | Jiang | F21K 9/238 |

* cited by examiner

*Primary Examiner* — Bao Q Truong

(74) *Attorney, Agent, or Firm* — Chun-Ming Shih; LANWAY IPR SERVICES

(57) ABSTRACT

A lighting apparatus includes a light source plate, multiple types of LED modules, a switch connector, a manual switch, a controller and a main housing. The multiple types of LED modules respectively emit lights of different parameters. The switch module is used for holding a state among multiple candidate states. The switch connector is disposed at least partially on a back side of the light source plate. The manual switch is coupled to the switch module via the switch connector to change the state. The controller is coupled to the switch module for determining a set of driving currents supplied to the multiple types of LED modules to emit a mixed light of a required parameter corresponding to the state of the switch module. a main housing for holding the light source plate. The main housing has a lateral wall.

18 Claims, 13 Drawing Sheets

LIGHTING APPARATUS

FIELD

The present invention is related to a lighting apparatus, and more particularly related to a lighting apparatus with a flexible setting.

BACKGROUND

LED (Light Emitting Diode) technology has undergone significant advancements since its invention in the early 1960s. Initially, LEDs were limited to emitting low-intensity red light, making them suitable primarily for indicator lights in electronic devices. The first visible-spectrum LEDs were created using gallium arsenide phosphide, which enabled the emission of red light. Over the decades, innovations in semiconductor materials and manufacturing processes have expanded the range of LED colors to include green, blue, and, eventually, white light, making LEDs versatile for various applications.

One of the major breakthroughs in LED technology came in the 1990s with the development of high-brightness blue LEDs by Japanese scientists Isamu Akasaki, Hiroshi Amano, and Shuji Nakamura. This advancement paved the way for the creation of white LEDs by combining blue LEDs with phosphor coatings that convert blue light into white light. This innovation was crucial for the widespread adoption of LEDs in general lighting, as it allowed LEDs to produce light that closely resembles natural daylight, making them suitable for a wide range of applications from residential to commercial and industrial lighting.

In the 21st century, LED technology has continued to evolve, leading to increased efficiency, longevity, and affordability. Modern LEDs are now capable of producing more light per watt than traditional incandescent and fluorescent bulbs while consuming significantly less energy. This efficiency translates into substantial cost savings on energy bills and reduced environmental impact. Additionally, the lifespan of LEDs far exceeds that of conventional lighting technologies, with many LEDs rated to last 25,000 hours or more, compared to the 1,000-hour lifespan of incandescent bulbs and the 10,000-hour lifespan of fluorescent tubes.

The widespread adoption of LED lighting has been driven by both technological improvements and regulatory measures. Governments and organizations worldwide have implemented policies to phase out inefficient incandescent bulbs and promote energy-efficient alternatives. For example, the European Union and the United States have introduced regulations that limit the production and sale of traditional incandescent bulbs, encouraging consumers to switch to LED lighting. These measures, coupled with increasing consumer awareness of the benefits of LEDs, have accelerated the transition to LED technology.

LEDs are now ubiquitous in various lighting applications, from residential and commercial spaces to outdoor and industrial settings. They are used in everything from streetlights and traffic signals to automotive headlights and decorative lighting. The flexibility of LED technology allows for innovative designs and applications, such as smart lighting systems that can be controlled remotely, and tunable white lighting that can adjust color temperature to mimic natural daylight patterns. Additionally, LEDs are being integrated into growing fields like horticulture lighting, where they provide specific light spectra to optimize plant growth.

The future of LED technology promises even more exciting developments. Research is ongoing to further improve the efficiency and color rendering of LEDs, making them an even more attractive option for various lighting needs. Advances in materials science, such as the development of organic LEDs (OLEDs) and quantum dot LEDs (QLEDs), are expanding the possibilities for LED applications. These technologies offer potential benefits such as flexible and transparent lighting panels, which could revolutionize display technologies and lighting design. As LED technology continues to evolve, it is poised to become the dominant lighting solution, replacing traditional light sources and shaping the future of illumination.

Since Thomas Edison introduced the first practical incandescent light bulb in 1879, light bulbs have remained a staple in households and businesses worldwide. The original design of the incandescent bulb, which uses a filament heated to high temperatures to produce light, set the stage for over a century of widespread use. Despite the emergence of more energy-efficient lighting technologies such as LEDs and compact fluorescent lamps (CFLs), traditional incandescent bulbs have retained their popularity for various reasons, continuing to illuminate homes, offices, and public spaces.

One of the primary advantages of incandescent light bulbs is their simplicity and reliability. Incandescent bulbs are easy to install and require no special fixtures or ballasts, making them a convenient choice for consumers. Their straightforward design has remained largely unchanged since their invention, relying on the basic principle of electrical resistance to generate light. This simplicity also translates to lower upfront costs, making incandescent bulbs an affordable option for many households, particularly in regions where energy costs are not prohibitively high.

Incandescent bulbs also have the benefit of providing excellent color rendering. The light produced by incandescent bulbs closely resembles natural sunlight, which means colors appear more vibrant and true to life. This quality is particularly important in settings where accurate color representation is essential, such as in art studios, photography, and retail environments. The warm, inviting glow of incandescent light is often preferred for creating cozy and comfortable atmospheres in homes and hospitality settings, contributing to their continued use despite the availability of newer technologies.

Another factor contributing to the continued popularity of incandescent light bulbs is their immediate full brightness upon switching on. Unlike some energy-efficient alternatives that may take time to warm up and reach full illumination, incandescent bulbs provide instant light, making them ideal for applications where immediate visibility is necessary. This characteristic is particularly valued in areas such as closets, basements, and outdoor security lighting, where reliable and prompt illumination is essential for safety and convenience.

The dimmability of incandescent bulbs is another significant advantage. Incandescent bulbs can be easily dimmed using standard dimmer switches, allowing users to adjust the brightness to suit different activities and moods. This feature is less common in many energy-efficient alternatives, which often require specialized dimming equipment and may not perform as well at lower light levels. The ability to smoothly transition from bright task lighting to a softer, ambient glow makes incandescent bulbs a versatile choice for various lighting needs within the same space.

Despite advancements in lighting technology, the nostalgic appeal and familiarity of incandescent light bulbs play a role in their enduring presence. Many people have grown accustomed to the quality of light produced by incandescent bulbs and prefer it over the sometimes harsher light of newer alternatives. This preference is reflected in the design of some modern LED bulbs, which are engineered to mimic the appearance and warmth of incandescent light, bridging the gap between tradition and innovation.

In summary, while energy-efficient technologies like LEDs and CFLs have gained prominence, incandescent light bulbs remain a common and popular choice due to their simplicity, affordability, excellent color rendering, immediate full brightness, ease of dimming, and nostalgic appeal. These advantages ensure that incandescent bulbs continue to have a place in the diverse landscape of modern lighting solutions, even as the industry moves toward more sustainable and innovative technologies.

LED technology offers significant advantages due to its flexible configuration options. LEDs can be designed in a wide range of shapes and sizes, allowing them to be integrated into various fixtures and applications that traditional bulbs cannot accommodate. This versatility extends to color options as well, with LEDs available in numerous hues and color temperatures, making them suitable for both functional and decorative purposes. The ability to precisely control light output and distribution through advanced optics and electronics further enhances their adaptability, enabling LEDs to meet diverse lighting requirements from accent lighting to high-intensity industrial applications.

Despite these benefits, the LED market still faces challenges in balancing convenience and cost. One of the primary hurdles is the initial expense associated with LED lighting. While the long-term savings in energy and maintenance costs can justify the higher upfront investment, many consumers and businesses are deterred by the initial cost barrier. This is particularly true in regions with lower energy prices, where the economic incentive to switch to LEDs is less compelling. Additionally, the perceived complexity of choosing the right LED product for specific needs can be overwhelming for consumers accustomed to the simplicity of incandescent or CFL options.

Innovation in LED design and manufacturing is key to addressing these challenges. For instance, advancements in semiconductor materials and fabrication techniques have the potential to reduce production costs and improve performance. Efforts to standardize LED products and simplify installation and compatibility with existing fixtures can also enhance consumer convenience. Moreover, integrating smart lighting features, such as remote control and automated dimming, into LED systems can add value and justify the higher initial investment, appealing to tech-savvy consumers and businesses looking for modern lighting solutions.

Another important aspect of balancing convenience and cost is improving the user experience with LED lighting. While LEDs offer unparalleled energy efficiency and longevity, their light quality and performance characteristics can vary widely depending on the design and manufacturing process. Ensuring consistent color rendering, minimizing flicker, and providing smooth dimming capabilities are critical to making LED lighting more appealing to a broader audience. Enhancing the reliability and lifespan of LED products through better heat management and robust electronic components is also essential to building consumer confidence in the technology.

The development of innovative LED designs tailored to specific applications can further drive adoption. For example, in the automotive industry, LEDs are increasingly used for headlights and interior lighting due to their durability and low power consumption. In horticulture, specialized LED grow lights provide optimal light spectra for plant growth, demonstrating the potential for LEDs to address niche markets with unique requirements. By focusing on application-specific innovations, manufacturers can create value-added solutions that meet the needs of various sectors while driving overall market growth.

Lastly, public awareness and education play a vital role in the widespread adoption of LED technology. Many consumers are still unaware of the long-term benefits of LEDs or are hesitant to make the switch due to misconceptions about performance and reliability. Effective marketing campaigns and educational initiatives that highlight the advantages of LEDs, such as energy savings, environmental impact, and improved light quality, can help bridge the knowledge gap and encourage more consumers to embrace LED lighting. Collaboration between manufacturers, governments, and environmental organizations can further support these efforts, promoting sustainable lighting solutions on a global scale.

In conclusion, while LED technology offers unparalleled flexibility and potential, achieving a balance between convenience and cost remains a challenge. Continued innovation in design and manufacturing, coupled with efforts to enhance user experience and increase public awareness, will be crucial in driving the widespread adoption of LEDs. By addressing these factors, the lighting industry can unlock the full potential of LED technology, paving the way for a more energy-efficient and sustainable future.

Light parameters such as color temperature, colors, and the Color Rendering Index (CRI) are crucial in providing enhanced illumination effects, influencing both the functionality and aesthetics of lighting. Color temperature, measured in Kelvin (K), describes the appearance of the light emitted by a bulb. It ranges from warm (2700K-3000K) to cool (5000K-6500K) and affects the ambiance and mood of a space. Warm light is typically used in residential settings for a cozy, inviting atmosphere, while cool light is preferred in workspaces and retail environments to promote alertness and clarity.

The availability of different colors in LED lighting adds another layer of versatility. LEDs can produce a wide spectrum of colors without the need for filters, unlike traditional lighting technologies. This capability allows for dynamic lighting designs and effects, from subtle mood lighting to vibrant color-changing displays. RGB (Red, Green, Blue) LEDs, in particular, can be combined in various intensities to create millions of colors, making them ideal for decorative lighting, stage lighting, and architectural installations. The ability to fine-tune colors also helps in highlighting specific areas or features within a space, enhancing visual appeal and functionality.

The Color Rendering Index (CRI) is another vital parameter that measures how accurately a light source reproduces the colors of objects compared to natural light. The CRI scale ranges from 0 to 100, with higher values indicating better color rendering. A high CRI is essential in settings where accurate color representation is crucial, such as art galleries, clothing stores, and medical facilities. LEDs with a high CRI provide more natural and vibrant colors, improving the visual experience and reducing eye strain. This is particularly important in tasks that require precision and attention to detail, such as reading, cooking, and inspecting products.

Advancements in LED technology have enabled the development of tunable white LEDs, which can adjust their color temperature throughout the day. This feature mimics the natural progression of sunlight, promoting better circadian rhythm and overall well-being. For example, cooler, blue-enriched light in the morning can help wake people up and improve concentration, while warmer light in the evening can aid in relaxation and prepare the body for sleep. Such dynamic lighting solutions are increasingly being used in offices, schools, and healthcare facilities to enhance comfort and productivity.

In addition to color temperature and CRI, other light parameters such as beam angle and luminous efficacy play important roles in achieving desired illumination effects. The beam angle determines the spread of light from a fixture, affecting how light is distributed in a space. Narrow beam angles are suitable for accent lighting, focusing on specific areas or objects, while wider beam angles are used for general lighting to cover larger areas. Luminous efficacy, measured in lumens per watt, indicates the efficiency of a light source in converting electrical energy into visible light. High luminous efficacy is essential for energy-saving and environmentally-friendly lighting solutions.

By carefully selecting and combining these light parameters, lighting designers can create customized illumination solutions that enhance the visual appeal and functionality of any space. For instance, in retail environments, high CRI and cool color temperatures can make merchandise look more attractive, while in residential settings, warm color temperatures and dimmable options can create a cozy and flexible atmosphere. In industrial and commercial applications, optimizing beam angles and luminous efficacy can improve visibility and reduce operational costs. Overall, understanding and leveraging light parameters is key to achieving optimal lighting performance and creating environments that cater to the specific needs and preferences of users.

The development of new LED designs that offer flexible control capabilities is highly beneficial, as it allows for versatile light effects that can be tailored to various needs conveniently. Advanced control systems enable users to adjust brightness, color temperature, and even color composition with ease, providing the ability to create different lighting atmospheres for different occasions. For example, a single light fixture could provide bright, cool light for working or studying and warm, dim light for relaxing in the evening, enhancing both functionality and comfort in a space.

Such flexibility in lighting control also offers significant energy savings and cost benefits. By using programmable settings and sensors, lighting systems can automatically adjust to the optimal levels required for specific tasks or times of day, reducing unnecessary energy consumption. Smart lighting systems can be integrated with home automation platforms, allowing for remote control and scheduling via smartphones or voice commands. This convenience not only improves the user experience but also contributes to lower electricity bills and a reduced environmental footprint, making the initial investment in advanced LED technology more justifiable.

Moreover, considering cost is crucial when designing versatile lighting solutions. Innovations in LED manufacturing and control technologies are making these advanced systems more affordable and accessible. By focusing on cost-effective designs that do not compromise on quality and performance, manufacturers can cater to a broader market, including residential, commercial, and industrial sectors. The ability to offer customizable, energy-efficient lighting solutions at a reasonable price point ensures that more users can benefit from the versatility and convenience of modern LED lighting, driving widespread adoption and fostering a more sustainable future.

SUMMARY

In some embodiments, a lighting apparatus includes a light source plate, multiple types of LED modules, a switch connector, a manual switch, a controller and a main housing.

The multiple types of LED modules are disposed on a front side of the light source plate.

The multiple types of LED modules respectively emit lights of different parameters.

The switch module is used for holding a state among multiple candidate states.

The switch connector is disposed at least partially on a back side of the light source plate.

The manual switch is coupled to the switch module via the switch connector to change the state.

The controller is coupled to the switch module for determining a set of driving currents supplied to the multiple types of LED modules to emit a mixed light of a required parameter corresponding to the state of the switch module.

The main housing is used for holding the light source plate.

The main housing has a lateral wall.

The manual switch is partially exposed on the lateral wall so that a user may operate the manual switch to change the state of the switch module.

In some embodiments, the lighting apparatus may also include a light shell covering the light source plate for the mixed light to pass through.

In some embodiments, the lighting apparatus may also include an Edison cap.

The Edison cap is attached to the main housing for guiding an external power to the multiple types of LED modules.

In some embodiments, oxygen air occupies less than 10% of total air installed inside a enclosing space defined by the light shell and the main housing.

In some embodiments, the lighting apparatus may also include a driver coupled to the controller.

The driver converts an external power to the driving currents according to a control of the controller.

In some embodiments, the driver includes driver circuits.

The driver circuits are mounted on the light source plate directly.

In some embodiments, a relative ratio among the set of driving currents respectively supplied to the multiple types of LED modules is adjusted under different state indicated by the switch module.

In some embodiments, the controller is further coupled to a dimmer.

The dimmer is operated by a user to change an overall light intensity.

The controller adjusts the relative ratio also by reference to the dimmer in addition to the state of the switch module.

In some embodiments, the switch connector is separate structure plugged to the light source plate.

In some embodiments, the switch connector includes a trigger structure to mechanically deliver an operation of the manual switch to slide a sliding switch of the switch module on the light source plate.

In some embodiments, the switch connector has a sliding unit.

The manual switch has a cover concealing the sliding unit and prevents water to move into the main housing.

In some embodiments, the switch module includes a switch circuit board mounted on the light source plate.

In some embodiments, the switch circuit board has a socket of the switch connector to plug into the socket to couple to the switch module.

In some embodiments, the switch circuit board is mounted on the front side of the light source plate.

In some embodiments, there is a switch hole disposed on the light source plate for the switch connector to partially pass through the switch circuit board.

In some embodiments, the manual switch is a circular belt surrounding the lateral wall of the main housing.

In some embodiments, the manual switch is a sliding switch for the user to slide to one among multiple candidate positions to select the state among the multiple candidate states.

In some embodiments, the manual switch has two operation directions respectively to set two different configuration parameters.

In some embodiments, the manual switch has a reverse hook to lock to the switch connector when the manual switch is pressed from a lateral opening of the main housing to couple the switch connector.

In some embodiments, the manual switch is a plastic unit without metal material.

DETAILED DESCRIPTION

Figure 9:
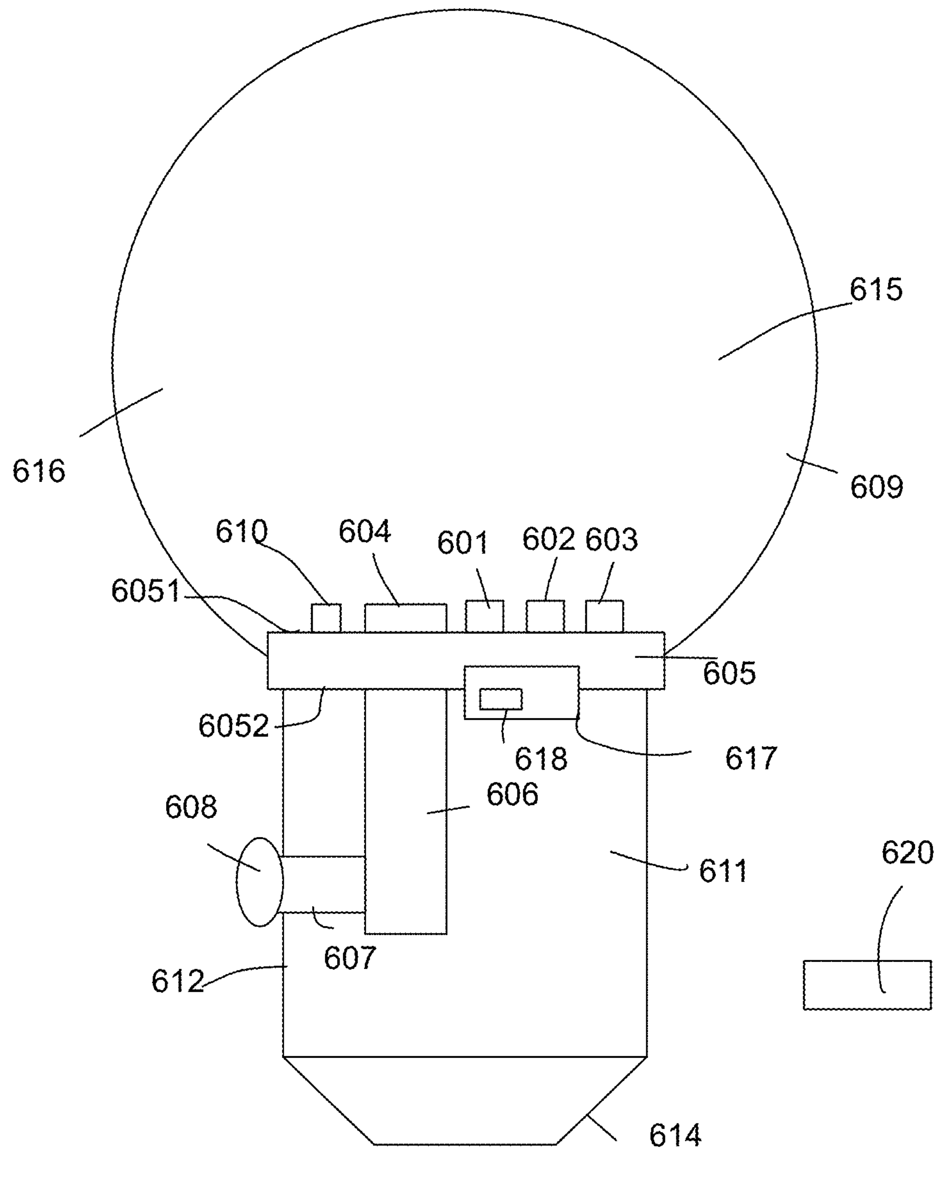
FIG. 9 illustrates another lighting apparatus embodiment.
Figure 10:
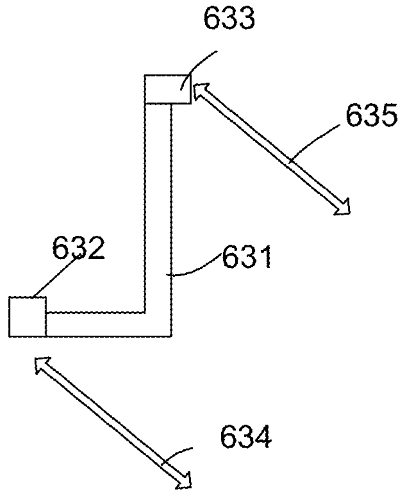
FIG. 10 shows a sliding movement of a switch example with a trigger structure.

In FIG. 9, a lighting apparatus includes a light source plate 605, multiple types of LED modules 601, 602, 603, a switch connector 606, a switch component 604, a manual switch 608, a controller 610 and a main housing 611.

The multiple types of LED modules 601, 602, 603 are disposed on a front side 6051 of the light source plate 605.

The multiple types of LED modules 601, 602, 603 respectively emit lights of different parameters.

By strategically arranging lenses over the LED module or selecting different types of LED chips, the light spanning angle can be precisely configured to meet specific requirements. Lenses can be designed to focus or diffuse light in various ways, allowing for control over the direction and spread of the emitted light. For instance, narrow beam lenses can concentrate light into a tight spot, ideal for accent lighting or highlighting specific areas. Conversely, wide-angle lenses can disperse light more broadly, creating an even illumination suitable for general lighting in large spaces. This flexibility in optical design ensures that LEDs can be tailored to a wide range of applications, from focused task lighting to expansive ambient lighting.

Selecting different types of LED chips also plays a crucial role in configuring the light spanning angle. Some LED chips are engineered to emit light in a specific pattern, while others can be paired with reflectors or diffusers to alter the light distribution. High-power LEDs often come with integrated optics that shape the light beam to desired specifications, providing manufacturers with options to create lighting solutions that precisely match the needs of their customers. For example, using a combination of narrow and wide-angle LED chips can create a versatile lighting fixture capable of providing both focused and broad illumination, enhancing the functionality and adaptability of the light source.

The ability to customize the light spanning angle through lens arrangement and LED chip selection is essential for optimizing lighting performance and efficiency. It allows for the creation of lighting solutions that not only meet aesthetic and functional criteria but also contribute to energy savings and reduced glare. In environments where precise lighting control is necessary, such as in retail displays, museums, or workspaces, the capability to adjust the light spanning angle ensures that the illumination is both effective and visually appealing. By leveraging these design strategies, LED lighting can be fine-tuned to provide the best possible lighting experience for any application, balancing performance, efficiency, and user comfort.

By mixing different types of LED modules with varying optical parameters, the overall light output can be finely tuned to achieve specific lighting effects and performance characteristics. Each LED module can be designed with distinct attributes such as color temperature, CRI, luminous flux, and beam angle. When these modules are combined, their individual properties blend to create a composite light with tailored optical parameters. This approach allows for the customization of lighting solutions to meet specific needs, such as creating a balanced light spectrum for a workspace that enhances both visual comfort and productivity.

For example, integrating warm white LEDs with a high CRI alongside cool white LEDs can produce a light that is both vibrant and energizing. This combination can be particularly beneficial in settings where a balance between a comfortable ambiance and accurate color rendering is essential, such as in retail stores or hospitality environments. Additionally, by incorporating LEDs with different beam angles, the overall light distribution can be adjusted to ensure uniform coverage while also providing focused illumination where needed. This level of configurability is crucial for creating dynamic lighting environments that can adapt to various tasks and user preferences.

Furthermore, mixing LED modules with different optical parameters allows for innovative lighting designs that can change dynamically. For instance, in smart lighting systems, the ability to mix different LEDs means that the light output can be adjusted in real-time to suit different activities or times of day. This could involve shifting the color temperature to mimic natural daylight patterns, or adjusting the intensity and distribution of light to create different moods. Such flexibility not only enhances user experience but also contributes to energy efficiency, as the lighting can be precisely controlled to provide the right amount of light exactly where and when it is needed. By leveraging the mix of various LED modules, lighting designers can create versatile and efficient solutions that cater to a wide array of applications and environments.

The switch module 604 is used for holding a state among multiple candidate states. For example, when the multiple candidate states are discrete, they may include 1800K, 2700K, 3500K, 4700K color temperatures, colors or other optical parameters.

The switch connector 606 is disposed at least partially on a back side 6052 of the light source plate 605.

The manual switch 608 is coupled to the switch module 604 via the switch connector 606 to change the state.

The controller 610 is coupled to the switch module 604 for determining a set of driving currents supplied to the multiple types of LED modules 601, 602, 603 to emit a mixed light of a required parameter corresponding to the state of the switch module 604.

The main housing 611 is used for holding the light source plate 605.

The main housing 611 has a lateral wall 612.

The manual switch 611 is partially exposed on the lateral wall 612 so that a user may operate the manual switch 608 to change the state of the switch module 604.

In FIG. 9, the manual switch 608 may have a portion protruding inside the main housing 611, so that a portion of the manual switch 608 is exposed outside the main housing 611 and another portion of the manual switch 608 is inside the main housing 611.

In some embodiments, the lighting apparatus may also include a light shell 609 covering the light source plate 605 for the mixed light to pass through.

In some embodiments, the lighting apparatus may also include an Edison cap 614.

The Edison cap 614 is attached to the main housing 611 for guiding an external power, e.g. 110V AC indoor power, to the multiple types of LED modules 601, 602, 603.

In some embodiments, oxygen air 615 occupies less than 10% of total air installed inside a enclosing space 616 defined by the light shell 609 and the main housing 611.

In some embodiments, the lighting apparatus may also include a driver 617 coupled to the controller 610.

The driver 617 converts an external power to the driving currents according to a control of the controller 610.

In some embodiments, the driver 617 includes driver circuits 618, e.g. capacitor, filter, rectifier, control chips.

The driver circuits 618 are mounted on the light source plate 605 directly.

In some embodiments, a relative ratio among the set of driving currents respectively supplied to the multiple types of LED modules is adjusted under different state indicated by the switch module.

Adjusting the relative ratio of driving currents supplied to multiple types of LED modules allows for dynamic and adaptable lighting solutions. This involves using a control system, such as a switch module, to vary the electrical current for each LED module. By controlling the driving currents, the intensity and characteristics of the light from each LED module can be precisely managed. This enables the creation of customized lighting scenarios that change based on different states or conditions, enhancing both functionality and aesthetics.

One effective way to implement this is through Pulse Width Modulation (PWM). PWM rapidly switches the current on and off at a high frequency, with the "on" time duration determining the effective current to the LED. Adjusting the duty cycle of the PWM signal allows for fine control of each LED module's relative intensity. For instance, in a setup with warm white and cool white LED modules, PWM can adjust their brightness levels. Increasing the duty cycle for warm white LEDs while decreasing it for cool white LEDs results in a warmer overall light, and vice versa.

For example, in a tunable white lighting system with LEDs of 2700K (warm white) and 6500K (cool white), adjusting the relative currents can create a range of color temperatures. Under a "daylight" setting, the control system might increase current to the cool white LEDs and decrease it to the warm white LEDs, producing a light closer to 6500K. In a "relax" setting, the system could do the opposite, favoring the warm white LEDs to create a cozy 2700K light.

Consider an RGB LED setup with individual red, green, and blue LED modules. By adjusting the driving currents to each color channel via PWM, you can mix colors in various proportions to achieve desired hues and brightness. To create purple light, the control system could supply higher currents to red and blue LEDs while reducing the current to green LEDs. This control allows for dynamic lighting effects tailored to specific events or moods, like transitioning from bright, energetic light for a party to soft, calming light for a quiet evening.

To implement such a system, engineers need a switch module capable of detecting different states and adjusting the PWM signals accordingly. Microcontrollers or dedicated lighting control units can interpret user inputs or automated schedules. For example, a smart home system might use sensors to detect the time of day and automatically adjust lighting to match natural daylight patterns. In the morning, it could increase current to cool white LEDs for invigorating light, and in the evening, favor warm white LEDs for a more relaxing environment.

In summary, adjusting the relative ratio of driving currents to multiple types of LED modules using techniques like PWM creates versatile and adaptive lighting solutions. This approach allows precise control over the light's color temperature, intensity, and overall ambiance, making it possible to tailor lighting to different needs and preferences. Whether for residential, commercial, or industrial applications, this method enhances the functionality and user experience of LED lighting systems, providing a sophisticated and energy-efficient solution for modern illumination needs.

In some embodiments, the controller is further coupled to a dimmer 620.

A dimmer is used to adjust the light intensity of a lighting device by controlling the amount of electrical power delivered to the light source. There are different types of dimmers, such as 0-10V dimmers and TRIAC dimmers, each using distinct methods to achieve dimming.

A 0-10V dimmer works by varying a low voltage control signal between 0 and 10 volts. This control signal is sent to the LED driver or ballast, which interprets the signal and adjusts the output power to the LED accordingly. When the control voltage is at 0 volts, the light is at its minimum brightness, often completely off. At 10 volts, the light is at its maximum brightness. Intermediate voltages correspond to intermediate brightness levels. This type of dimming is straightforward and provides a smooth, linear dimming curve. It is widely used in commercial and industrial settings where precise control over lighting levels is needed.

A TRIAC (Triode for Alternating Current) dimmer operates by chopping the AC voltage waveform. It works by turning the voltage on and off at a high frequency. The TRIAC dimmer adjusts the phase of the AC power being sent to the light. By delaying the point at which the TRIAC turns on during each AC cycle, the effective power delivered to the light source is reduced, dimming the light. This method is known as phase-cut dimming. There are two types of phase-cut dimming: leading-edge and trailing-edge. Leading-edge dimmers are more common and typically used with incandescent and halogen lights, whereas trailing-edge dimmers are better suited for LEDs and other electronic loads due to their smoother operation and lower risk of flicker.

Implementing dimming with these technologies requires compatible LED drivers or ballasts. For 0-10V dimming, the driver must be capable of interpreting the low voltage control signal. For TRIAC dimming, the driver needs to handle the chopped AC waveform appropriately. Proper integration ensures that the dimming is smooth and flicker-free, providing a consistent lighting experience across the dimming range.

In summary, dimmers like 0-10V and TRIAC are essential tools for adjusting the light intensity of lighting devices. They provide flexibility and control, allowing users to create the desired lighting ambiance and save energy by reducing unnecessary light output. Understanding how each type of dimmer works and selecting the right one for the application ensures effective and efficient lighting control.

The dimmer is operated by a user to change an overall light intensity.

The controller adjusts the relative ratio also by reference to the dimmer in addition to the state of the switch module.

The controller adjusts the relative ratio of driving currents not only by referencing the state of the switch module but also by taking into account the dimmer settings. This means that as the dimmer changes the light intensity, the controller simultaneously adjusts other optical parameters such as color temperature to create a holistic lighting environment. This approach ensures that the lighting is adaptive and dynamic, aligning with natural light patterns and user preferences.

For instance, in a system designed to simulate daylight, the controller can modify the light intensity and color temperature throughout the day. At noon, when natural daylight is at its peak, the light intensity is set to its maximum, while the color temperature is adjusted to a cooler level, around 6500K, to mimic the bright, blue-tinged light of midday sun. This high-intensity, cool light enhances visibility and productivity, creating an environment that feels vibrant and energizing.

In the morning or during sunset, the controller lowers the light intensity to simulate the softer, more diffuse light typical of these times of day. Simultaneously, the color temperature is adjusted to a warmer level, such as 2700K, reflecting the warmer hues of dawn and dusk. This adjustment not only matches the natural progression of daylight but also provides a calming and relaxing atmosphere, which can help ease the transition from sleep to wakefulness in the morning, or from active to restful states in the evening.

To implement this, the controller must have a predefined schedule or be capable of receiving inputs from sensors that detect the time of day. As the dimmer is adjusted manually or automatically, the controller continuously monitors the dimmer settings and modifies the driving currents to the LED modules accordingly. This ensures that as the brightness changes, the color temperature also shifts in a synchronized manner, maintaining a natural lighting effect throughout the day.

This dynamic adjustment can also be customized to suit different user preferences or specific applications. For example, in an office environment, the system can be set to provide maximum brightness and cooler color temperatures during working hours to boost alertness and concentration. In contrast, in a residential setting, the system might favor warmer, softer lighting in the evenings to promote relaxation and comfort.

By integrating the dimmer settings with the control of optical parameters, lighting systems can offer a more comprehensive and user-friendly experience. This integration allows for the creation of lighting conditions that are both functional and aesthetically pleasing, adapting seamlessly to the changing needs of the environment and its occupants. The result is a sophisticated lighting solution that enhances well-being and efficiency, making spaces more adaptable and enjoyable to live and work in.

In some embodiments, the switch connector is separate structure plugged to the light source plate.

In some embodiments, the switch connector includes a trigger structure 631 to mechanically deliver an operation of the manual switch 632, along a track, to slide a sliding switch 633 of the switch module on the light source plate.

In some embodiments, the switch connector has a sliding unit.

Figure 7:
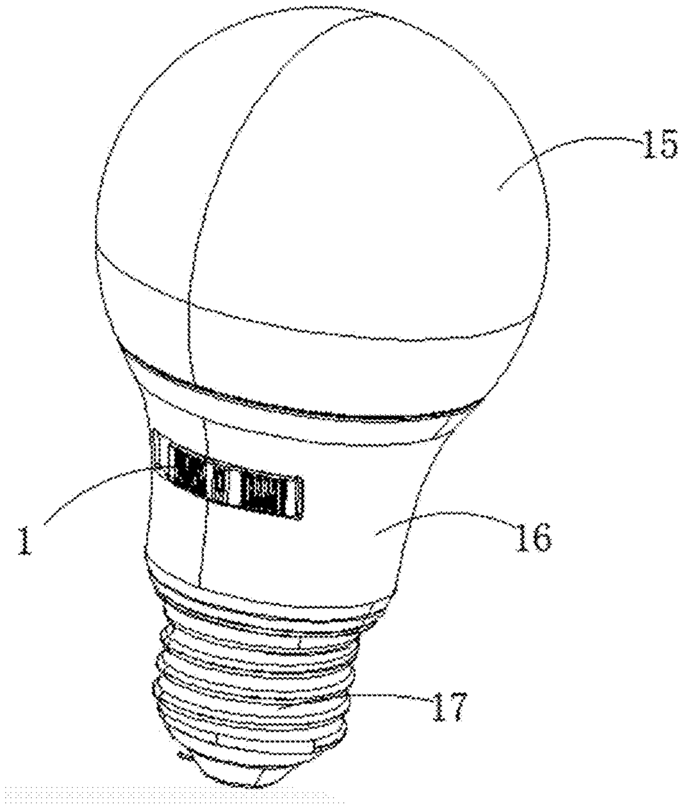
FIG. 7 illustrates a light bulb embodiment.

The manual switch has a cover concealing the sliding unit and prevents water to move into the main housing. FIG. 7 shows such an example and will be explained in more details below.

In some embodiments, the switch module includes a switch circuit board mounted on the light source plate.

Figure 8:
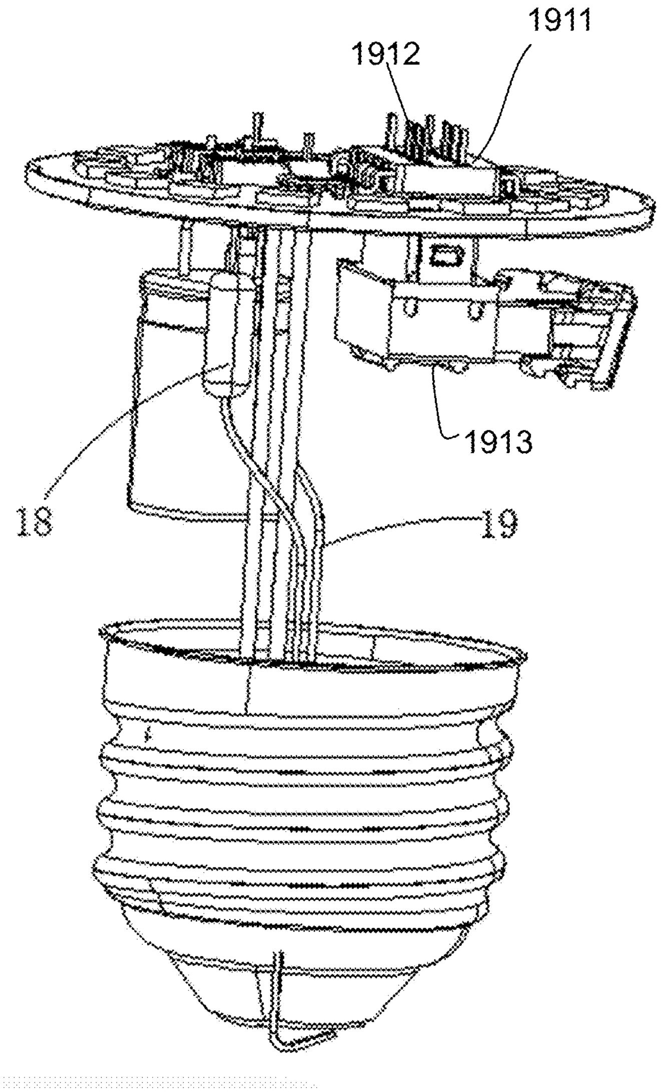
FIG. 8 illustrates an explosive view of the example in FIG. 7.

In FIG. 8, the switch circuit board 1911 has a socket 1912 of the switch connector 1913 to plug into the socket to couple to the switch module.

In some embodiments, the switch circuit board is mounted on the front side of the light source plate.

Figure 4:
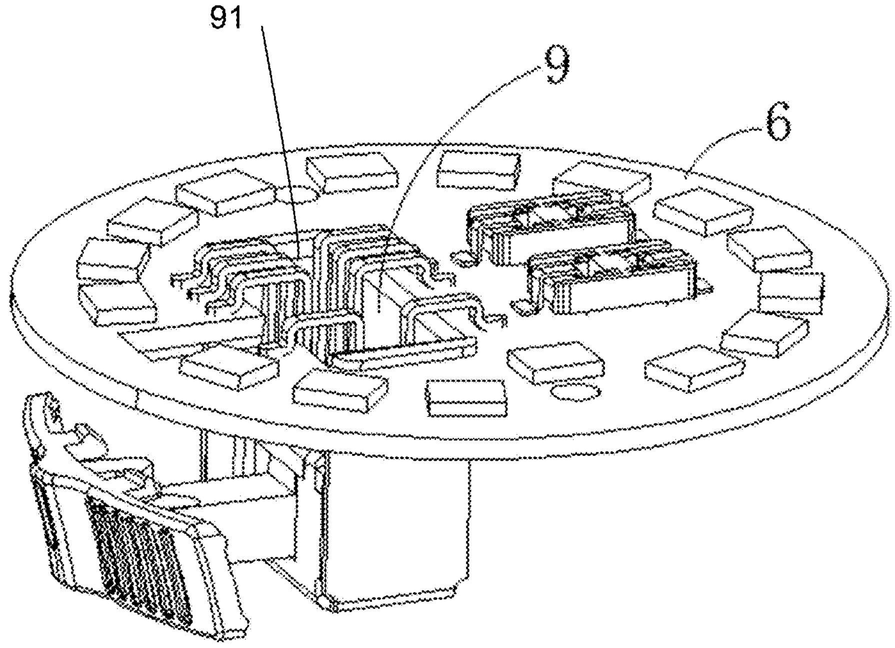
FIG. 4 illustrates a light source plate coupled with a switch module.

In FIG. 4, there is a switch hole 91 disposed on the light source plate 6 for the switch connector to partially pass through the switch circuit board.

Figure 11:
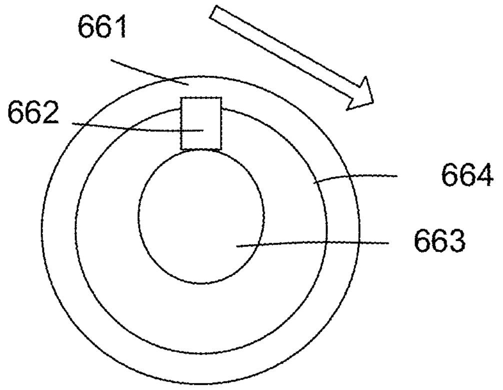
FIG. 11 shows a circular belt switch example.

In FIG. 11, the manual switch is a circular belt 661 surrounding the lateral wall 664 of the main housing. When the circular belt 661 is rotated, it carries a lever 662 to trigger a rotation detector 663 an adjustment of a parameter.

In some embodiments, the manual switch is a sliding switch for the user to slide to one among multiple candidate positions to select the state among the multiple candidate states.

Figure 12:
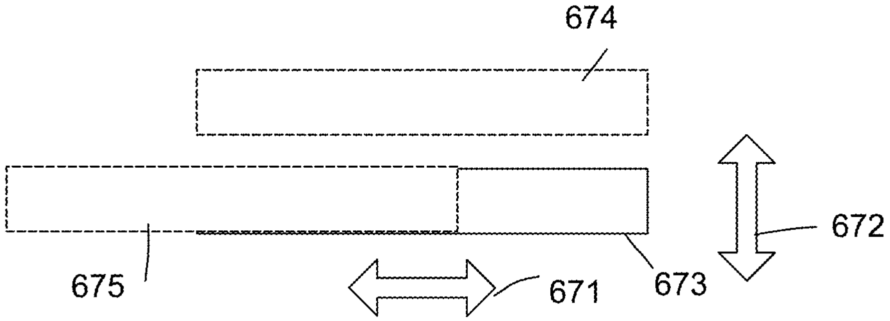
FIG. 12 shows a switch with two operation directions.

FIG. 12 shows a sliding switch that provides two directions 671, 672 of operations. By moving a switch from position 673 to 674 along a second direction 672, it changes a first type of parameter, e.g. color temperature. By moving the switch from position from 673 to 675 along a first direction 671, a second type of parameter, e.g. color or color rendering index, is adjusted.

In some embodiments, the manual switch has two operation directions respectively to set two different configuration parameters.

Figure 13:
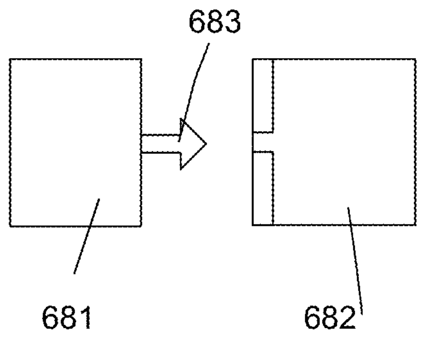
FIG. 13 shows a reverse hook to lock components.

In FIG. 13, the manual switch 681 has a reverse hook 683 to lock to the switch connector 682 when the manual switch is pressed from a lateral opening of the main housing to couple the switch connector.

In some embodiments, the manual switch is a plastic unit without metal material.

Please refer to FIGS. 1-4. This application provides an embodiment of a dip switch used in a lighting fixture, comprising a switch head 1, a switch piece 2, a housing 4, and pins 5.

The switch head 1 is located on the exterior surface of the lighting fixture and has at least two positions.

The switch piece 2 is located inside the lighting fixture and has a conductor 3 on it. The switch head 1 is connected to the switch piece 2, and switching the positions of the switch head 1 drives the switch piece 2 to move, thereby causing the conductor 3 to move.

The housing 4 is fixed inside the lighting fixture, and the switch piece 2 is installed within the housing 4 and is used for moving within the housing 4.

The pins 5 are electrically connected to the PCB board 6 of the light source assembly. When the switch head 1 is in different positions, the conductor 3 contacts different pins 5 to conduct.

Specifically, this dip switch is located inside the lighting fixture, but the switch head 1 is on the exterior surface of the fixture, making it convenient for manual operation. The switch head 1 has at least two positions during operation, allowing for different functions to be switched when in different positions.

The movement of the switch head 1 aims to drive the switch piece 2. The switch piece 2 has a conductor 3, and when the switch piece 2 moves, it drives the conductor 3 to move, positioning the conductor 3 at different locations.

The housing 4 provides support, and the switch piece 2 is set inside the housing 4 for moving within it. When the conductor 3 is in different positions, it electrically connects with different pins 5, thereby achieving different functions.

In this embodiment, the pins 5 are directly electrically connected to the PCB board 6 of the light source assembly. Each pin 5 is connected to different soldering points, achieving different functions.

Thus, the dip switch provided in this embodiment is directly electrically connected to the PCB board of the light source assembly, eliminating the need for an adapter PCB board, reducing components, and simplifying the assembly process.

As shown in FIG. 4, in a preferred embodiment, the dip switch is located on one side of the PCB board 6 of the light source assembly, with the pins 5 passing through the PCB board 6 and electrically connecting to the other side of the PCB board 6.

Specifically, since the switch head 1 is generally located near the lamp cap assembly 17 of the bulb, and the PCB board 6 of the light source assembly is generally near the bulb shell 15, the electrical connection points of the PCB board 6 are usually on the side facing the bulb shell 15. This positioning places the internal switch piece 2 on the side of the PCB board 6 of the light source assembly that does not have electrical connection points.

Based on the above considerations, this embodiment provides that the pins 5 have a certain length and are set to pass through the PCB board 6 of the light source assembly, thus electrically connecting to the side of the PCB board 6 that has electrical connection points.

The effect of this embodiment is that it allows the pins 5 to electrically connect to the PCB board 6 of the light source assembly without the need for an adapter PCB board, thereby achieving the corresponding function.

Figure 1:
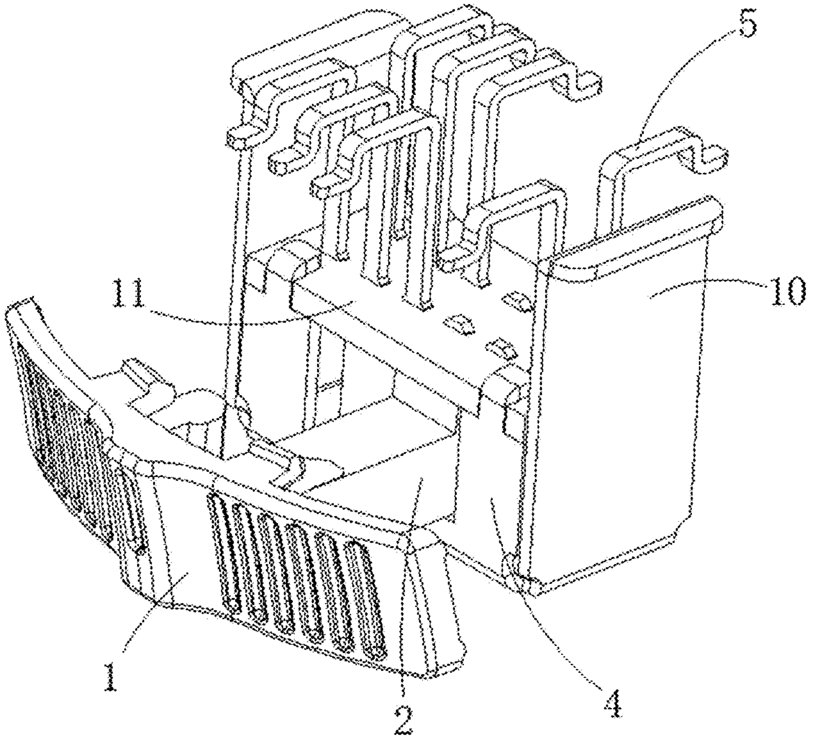
FIG. 1 illustrates a switch example.

As shown in FIGS. 1 and 4, further, the portion of the pin 5 that passes through the light source assembly PCB board 6 is a bent structure, with the end of the bent structure electrically connected to the light source assembly PCB board 6. The pin 5 can be configured in an L-shape or a 7-shape, creating a hooked structure after passing through the light source assembly PCB board 6, thereby forming an electrical connection with the PCB board 6.

The effectiveness of this embodiment lies in providing a specific structural form for the pin 5, enabling it to connect with the electrical connection points on the other side of the light source assembly PCB board 6, thereby achieving the corresponding function.

Figure 5:
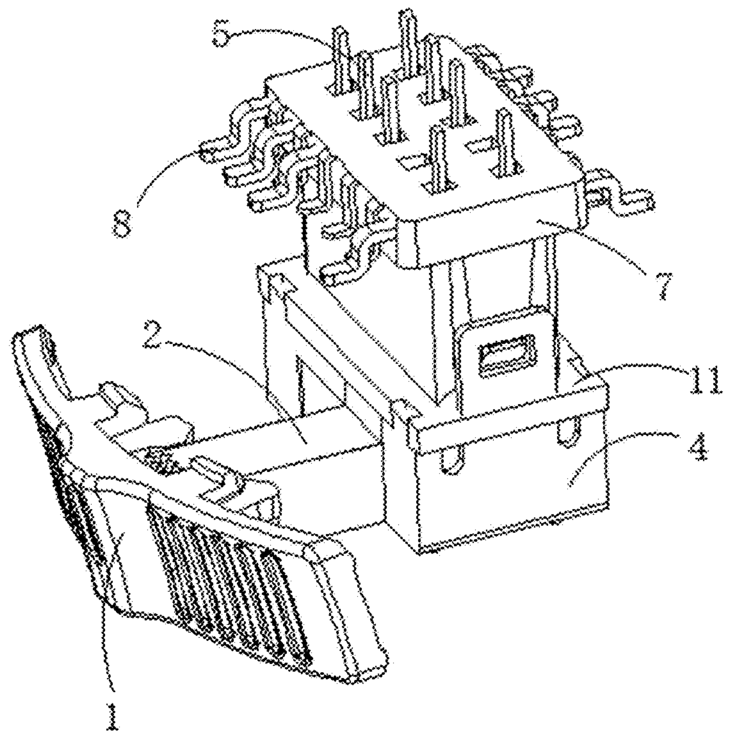
FIG. 5 illustrates a perspective view of a switch example.
Figure 6:
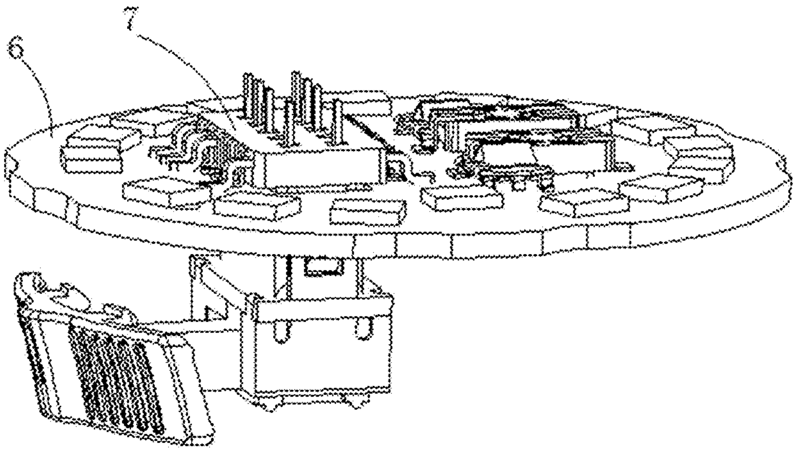
FIG. 6 illustrates another view of the example in FIG. 5.

As shown in FIGS. 5 and 6, in another embodiment, the dip switch further includes a socket 7, which is fixed to the light source assembly PCB board 6. The socket 7 has pins 8 that electrically connect to the light source assembly PCB board 6. The pin 5 plugs into the socket 7 to electrically connect with the pins 8, and the housing 4 is fixedly connected to the socket 7.

Besides using the bent pin 5 to achieve the connection with the light source assembly PCB board 6, this alternative setup can also be employed. The dip switch includes a socket 7 that serves as an intermediate connector. The socket 7 is fixed to and electrically connected to the light source assembly PCB board 6, specifically through the pins 8 on the socket 7.

With the socket 7 in place, it eliminates the need for the pin 5 to pass through the light source assembly PCB board 6. Holes can be made in the PCB board 6 to accommodate the socket 7, which, when assembled in the holes, exposes both sides of the socket 7. One side has the pins 8 for electrical connection to the PCB board 6, while the other side is for the insertion of the pin 5.

Multiple holes can be set in the socket 7 for the insertion of pin 5, which then electrically connects with the pins 8 in the socket 7. Each hole can correspond to a pin 8. Additionally, the housing 4, fixed inside the lamp body, can be relatively fixed with the socket 7. This setup allows the housing 4 to be secured, ensuring that when the pin 5 is inserted into the socket 7, it effectively connects the housing 4 with the socket 7.

Specifically, holes can be set in the socket 7, and plugs can be set on the socket 7, with the plugs inserted into the socket 7 to achieve physical plug-in fixation. Alternatively, clips can be set on the socket 7, and slots can be set on the housing 4, with the clips snapping into the slots to achieve the connection between the housing 4 and the socket 7.

Therefore, this embodiment provides another way to connect pin 5 to the electrical connection point on the other side of the light source assembly PCB board 6, achieving the same function. Both of the aforementioned embodiments accomplish the electrical connection between the dip switch and the light source assembly PCB board 6 without the need for an intermediate PCB board.

As shown in FIG. 4, in the preferred embodiment of this example, the light source assembly PCB board 6 is provided with through holes 9 for the pin 5 to pass through. The housing 4 is equipped with two oppositely arranged clamping plates 10 that extend into the through holes 9 and clamp the opposite sides of the through holes 9 to secure the housing 4 to the light source assembly PCB board 6.

Specifically, when the pin 5 passes through the light source assembly PCB board 6, the through holes 9 are set up on the PCB board 6 for the pin 5 to pass through. The housing 4 has two parallel clamping plates 10 set up opposite each other, with a certain distance between them. The through holes 9 are rectangular, and the two clamping plates 10 are inserted into the through holes 9, clamping the two opposite edges of the through holes 9 to achieve the connection.

The distance between the two clamping plates 10 can be slightly greater than the distance between the two edges of the hole, allowing the clamping plates 10 to exert some pressure on the hole edges, increasing the firmness. Additionally, projections can be set on the clamping plates 10 to latch onto the hole edges, preventing detachment.

This embodiment's effect lies in providing a simple and reasonably assembled, yet sturdy connection form for the housing 4 when the pin 5 directly passes through the light source PCB board.

Figure 3:
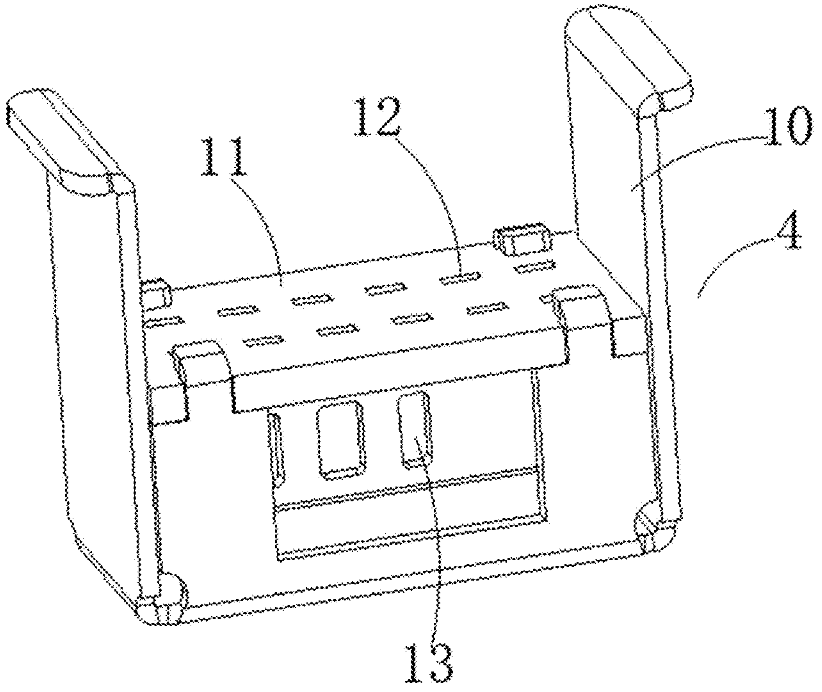
FIG. 3 illustrates another component in a switch example.

As shown in FIG. 3, in the preferred embodiment provided by this example, to ensure the firmness of the pin 5, this embodiment further includes a detachable pin board 11, which covers the top of the housing 4. The pin board 11 has pin holes 12, and the pin 5 is inserted into the pin holes 12 to extend into the interior of the housing 4.

When the pin board 11 covers the top of the housing 4, it is relatively fixed with the housing 4. There are multiple pin holes 12, which can all be used for inserting pin 5. The pin 5 is inserted through the pin holes 12 and extends into the interior of the housing 4 to contact the internal conductor 3 of the housing 4.

This embodiment's effect is to increase the firmness of the pin 5 relative to the housing 4, ensuring that when the toggle piece 2 moves the conductor 3, the pin 5 remains relatively stationary, allowing the moving conductor 3 to smoothly contact the predetermined pin 5.

Figure 2:
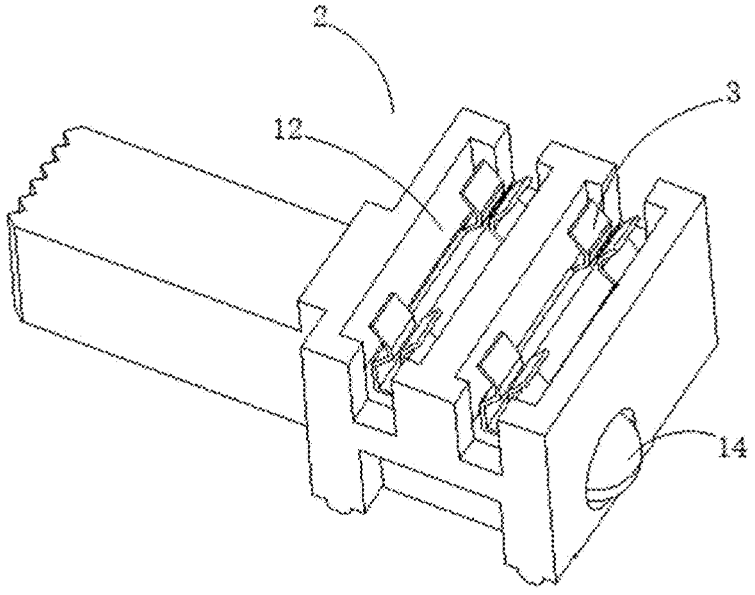
FIG. 2 illustrates a component in a switch example.

As shown in FIG. 2, further, the conductor 3 is set in the toggle piece 2. The toggle piece 2 has a receiving slot 12, which houses the conductor 3. The conductor 3 includes opposite spring pieces that clamp the pin 5 to achieve contact conduction.

Specifically, the receiving slot 12 is long, and the conductor 3 is a corresponding long shape, fitting into the receiving slot 12 and remaining fixed. The conductor 3 has spring pieces with clamping force, allowing the end of pin 5 to enter between the spring pieces as the conductor 3 moves. Further movement or return movement allows the conductor 3 to detach from pin 5 or switch to another pin 5.

Alternatively, two receiving slots 12 can be set parallel to each other, each housing a conductor 3, with each conductor 3 corresponding to one row of pin ends 5.

As shown in FIGS. 2 and 3, as a further embodiment, to ensure that the toggle piece 2 can stop at preset positions and stay in those positions, i.e., keep the toggle head 1 at the corresponding position, the housing 4 has multiple positioning holes 13 arranged along the moving direction of the toggle piece 2. The toggle piece 2 also has an inner groove housing a steel ball 14 and a spring, which pushes the steel ball 14 out of the inner groove to press against the positioning holes 13, locking the toggle head 1 in place.

Specifically, the number of positioning holes 13 corresponds to the number of positions. When the toggle piece 2 moves to a position, the steel ball 14, under spring pressure, enters the positioning hole 13, which is set in the housing 4 and has a diameter smaller than the steel ball 14. The positioning hole 13 accommodates the steel ball 14, limiting its movement, thereby keeping the toggle piece 2 and toggle head 1 at the corresponding position.

To switch positions, the toggle head 1 is driven, compressing the spring and releasing the steel ball 14 from the positioning hole 13, moving along the housing 4's inner wall to the next positioning hole 13.

The spring's one end can be connected to the bottom of the inner groove, and the other end to the steel ball 14, with the spring's pushing direction aligned with the inner groove's length direction.

This embodiment ensures precise positioning of the toggle piece 2, maintaining it well at the set position.

As shown in FIG. 7, this application also provides a specific embodiment of a bulb, equipped with any of the aforementioned embodiments of the dip switch.

This bulb, equipped with the dip switch, reduces the number of assembly components and increases assembly efficiency.

As shown in FIG. 8, further, the light source assembly PCB board 6 of the bulb is an optoelectronic integrated PCB board, with the toggle head 1's moving direction perpendicular to the bulb's axis.

By eliminating the intermediate PCB board, the light source assembly PCB board 6 can be an optoelectronic integrated PCB board, which includes LED light-emitting devices, driver components, eyelet rivets, protection resistor lines 18, and power lines 19, capable of direct connection to mains electricity, thus eliminating the need for an intermediate PCB board for electrical connections.

The bulb also includes a bulb shell 15, a heat sink 16 (sleeve), and a lamp holder assembly 17.

The toggle head 1 moves horizontally. Without the intermediate PCB board, the toggle head 1 can be positioned closer to the end of the bulb shell 15, making it more intuitive and visible, with enough space for easy toggling when installed in the fixture.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source plate;

multiple types of LED modules disposed on a front side of the light source plate, wherein the multiple types of LED modules respectively emit lights of different parameters;

a switch module for holding a state among multiple candidate states;

a switch connector disposed at least partially on a back side of the light source plate;

a manual switch coupled to the switch module via the switch connector to change the state;

a controller coupled to the switch module for determining a set of driving currents supplied to the multiple types of LED modules to emit a mixed light of a required parameter corresponding to the state of the switch module; and a main housing for holding the light source plate, wherein the main housing has a lateral wall, wherein the manual switch is partially exposed on the lateral wall so that a user may operate the manual switch to change the state of the switch module, wherein the switch module comprises a switch circuit board mounted on the light source plate, wherein the switch circuit board has a socket of the switch connector to plug into the socket to couple to the switch module.

2. The lighting apparatus of claim 1, further comprising a light shell covering the light source plate for the mixed light to pass through.

3. The lighting apparatus of claim 2, further comprising an Edison cap, wherein the Edison cap is attached to the main housing for guiding an external power to the multiple types of LED modules.

4. The lighting apparatus of claim 2, wherein oxygen air occupies less than 10% of total air installed inside a enclosing space defined by the light shell and the main housing.

5. The lighting apparatus of claim 1, further comprising a driver coupled to the controller, wherein the driver converts an external power to the driving currents according to a control of the controller.

6. The lighting apparatus of claim 5, wherein the driver comprises driver circuits, wherein the driver circuits are mounted on the light source plate directly.

7. The lighting apparatus of claim 5, wherein a relative ratio among the set of driving currents respectively supplied to the multiple types of LED modules is adjusted under different state indicated by the switch module.

8. The lighting apparatus of claim 7, wherein the controller is further coupled to a dimmer, wherein the dimmer is operated by a user to change an overall light intensity, wherein the controller adjusts the relative ratio also by reference to the dimmer in addition to the state of the switch module.

9. The lighting apparatus of claim 1, wherein the switch connector is separate structure plugged to the light source plate.

10. The lighting apparatus of claim 9, wherein the switch connector comprises a trigger structure to mechanically deliver an operation of the manual switch to slide a sliding switch of the switch module on the light source plate.

11. The lighting apparatus of claim 9, wherein the switch connector has a sliding unit, wherein the manual switch has a cover concealing the sliding unit and prevents water to move into the main housing.

12. The lighting apparatus of claim 1, wherein the switch circuit board is mounted on the front side of the light source plate.

13. The lighting apparatus of claim 12, wherein there is a switch hole disposed on the light source plate for the switch connector to partially pass through the switch circuit board.

14. The lighting apparatus of claim 1, wherein the manual switch is a circular belt surrounding the lateral wall of the main housing.

15. The lighting apparatus of claim 1, wherein the manual switch is a sliding switch for the user to slide to one among multiple candidate positions to select the state among the multiple candidate states.

16. The lighting apparatus of claim 1, wherein the manual switch has two operation directions respectively to set two different configuration parameters.

17. The lighting apparatus of claim 1, wherein the manual switch has a reverse hook to lock to the switch connector when the manual switch is pressed from a lateral opening of the main housing to couple the switch connector.

18. The lighting apparatus of claim 1, wherein the manual switch is a plastic unit without metal material.

* * * * *